July 20, 1965 — W. H. A. TECHTMANN — 3,196,067
HEAT SEALING MACHINES
Filed April 9, 1962 — 2 Sheets-Sheet 1
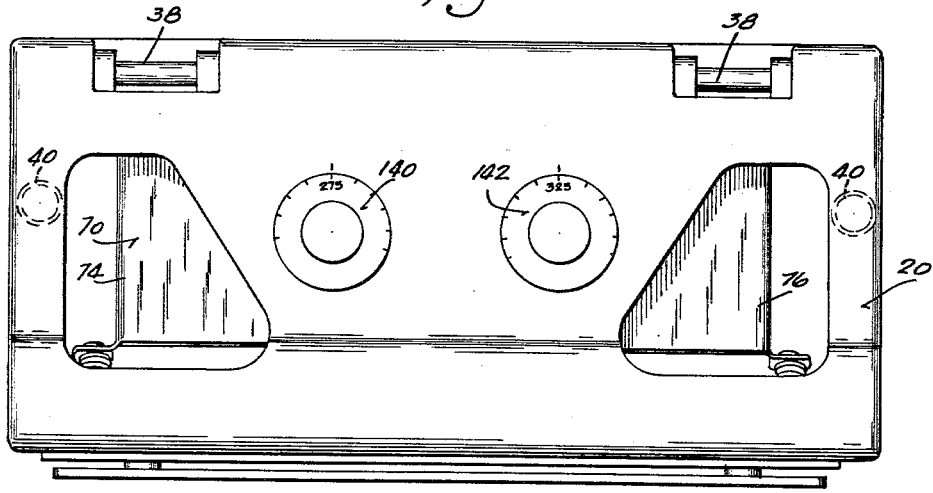
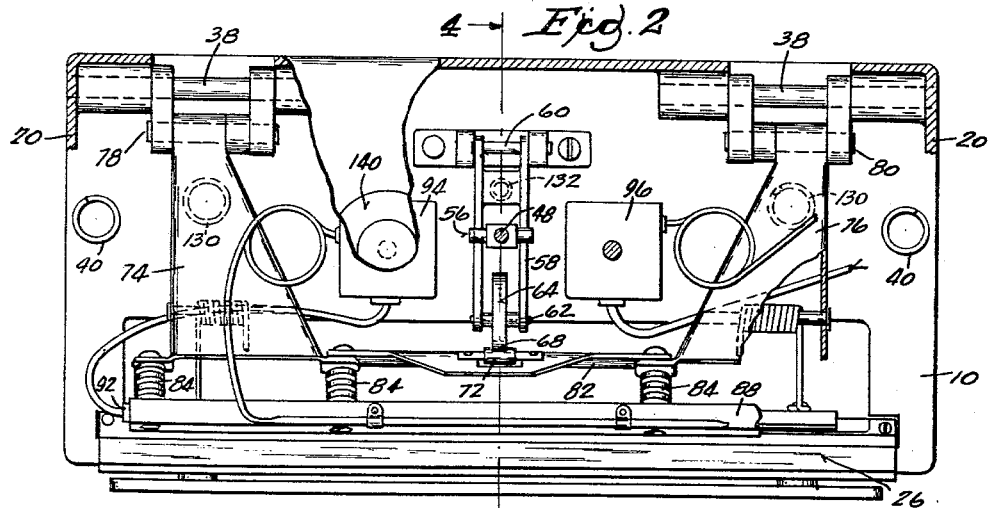
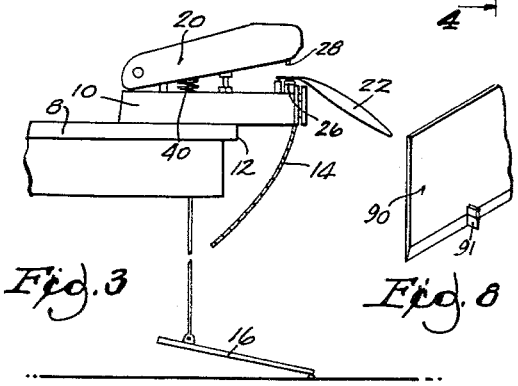
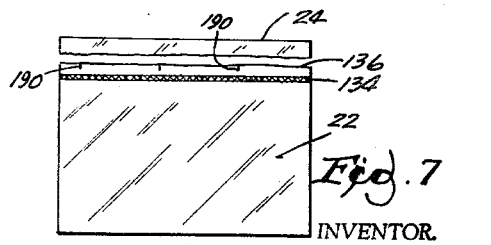
INVENTOR.
WILBUR H. A. TECHTMANN
BY
Wheeler, Wheeler & Wheeler
ATTORNEYS

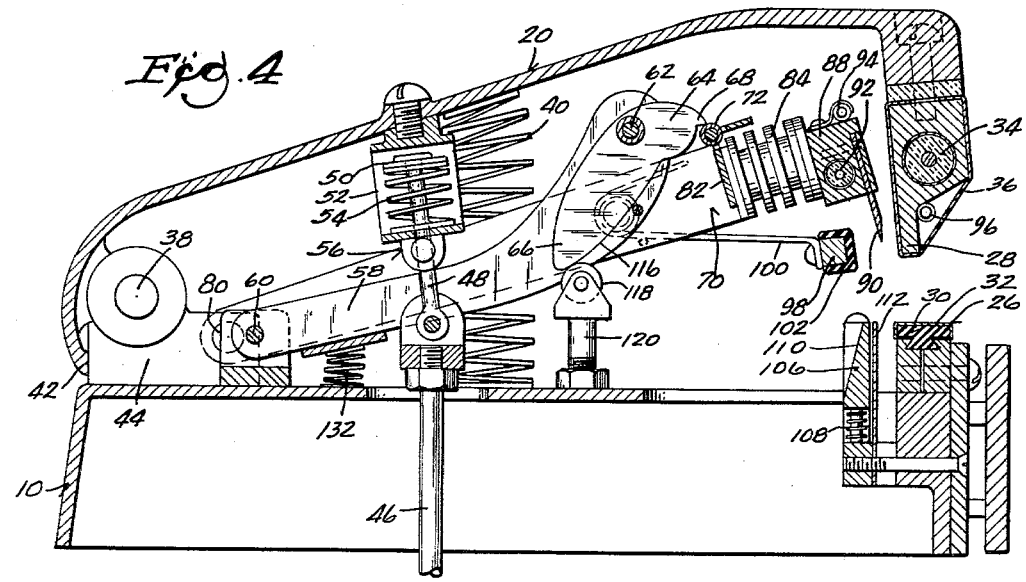
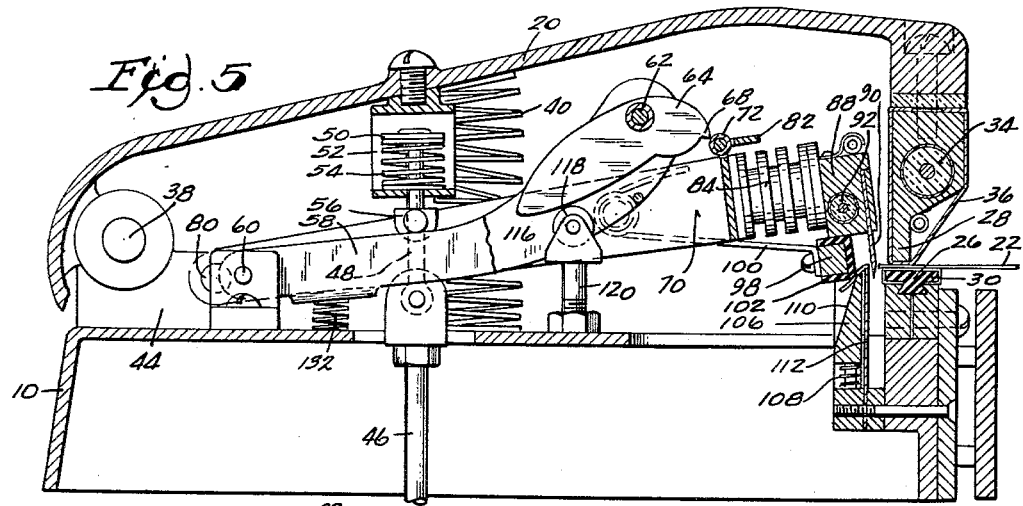
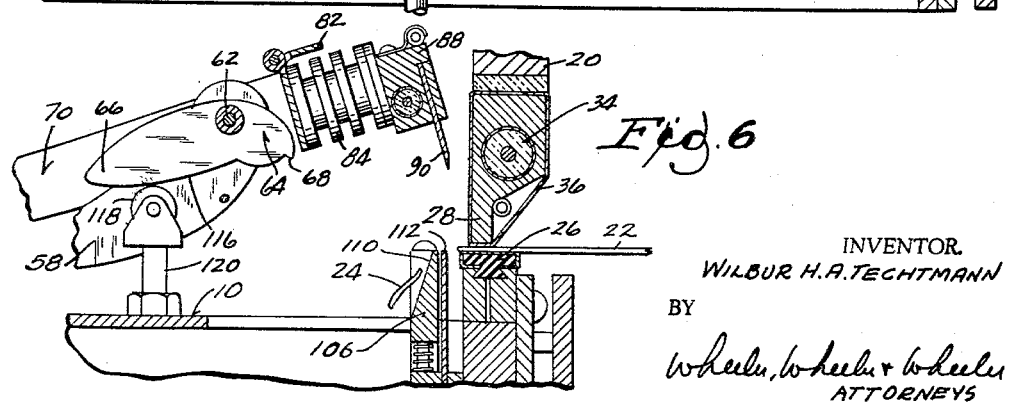

3,196,067
HEAT SEALING MACHINES

Wilbur H. A. Techtmann, Belgium, Wis., assignor to Techtmann Industries, Inc., Milwaukee, Wis., a corporation of Wisconsin
Filed Apr. 9, 1962, Ser. No. 186,155
10 Claims. (Cl. 156—530)

This invention relates to heat sealing machines for bags and the like.

In its preferred embodiment the device is a simple and inexpensive bench type heat sealer wherein the mouth of the bag to be sealed is laid on an anvil. A heat sealing die descends to engage the work and effect the seal. In the course of the descent of the die, the free end of the bag is engaged by a clamping member which subjects it to tension. Thus the work is clamped along two spaced lines, at one of which the seal is effected. A heated knife then engages the tensioned work between the lines along which it is clamped to sever the free end of the bag in proximity to the heat seal. The arrangement is such that the parts which communicate motion to the knife are tripped to release the knife and permit it to be retracted so that it will not become fouled during continued pressure of the heat sealing die upon the work, if such continued pressure is desired.

These movements are effected in simple manner by an inexpensive mechanism such that motion from a foot treadle or the like is communicated successively to three levers, one of which carries the heat sealing die and another of which carries the knife and has a yieldable arm carrying the clamping means. The third lever receives motion directly from the first mentioned lever and has a releasable tripping mechanism for communicating that motion to the second mentioned lever.

In the drawings:

FIG. 1 is a plan view of a preferred embodiment of the invention.

FIG. 2 is a view similar to FIG. 1 with all but a fragmentary portion of the cover lever broken away.

FIG. 3 is a view of the device in side elevation on a greatly reduced scale.

FIG. 4 is an enlarged detail view taken in section on the line 4—4 of FIG. 2 showing the parts in retracted position.

FIG. 5 is a view similar to FIG. 4 showing the parts in an advanced position.

FIG. 6 is a fragmentary view similar to FIGS. 4 and 5 showing the parts as they appear when the knife-carrying lever is released by the tripping mechanism.

FIG. 7 is a fragmentary detail view in plan showing a portion of a heat sealed bag from which scrap representing the free mouth portion of the bag has been separated.

FIG. 8 shows fragmentarily in perspective a portion of a modified cut-off knife.

As shown in FIG. 3, the bench 8 supports the base 10 of the apparatus in a position to overhang the front part 12 of the bench. An apron 14 is preferably provided to direct scrap to the floor behind foot treadle 16, which constitutes a preferred means for sequentially operating the levers 20, 58 and 70 hereinafter described. Lever 20 serves as a cover for the operating parts. The work is represented by a bag illustrated in side elevation at 22 in FIG. 3. The bag has an open mouth portion 24 projecting beyond an anvil 26 against which the heat seal is effected by the die 28 carried at the free end of the cover lever 20 as best shown in FIGS. 4 and 5.

The anvil 26 may conveniently be made of a block 30 of silicone or the like covered with a jacket 32 which may be impregnated with some release material such as "Teflon." The heat sealing die 28 is desirably made of metal having an opening to receive the heating element 34, the die preferably being enclosed in a jacket 36 which will not adhere to the heat sealable material of the bag and will usually constitute "Teflon"-impregnated fiberglass or something comparable.

The cover lever 20 is pivoted to the base by means of pintles 38 and supported by springs 40 which bias the lever upwardly to the extent of movement permitted it by engagement of the stop portion 42 at the rear of the lever with the block 44 which is mounted on the base 10 to carry the pintles 38. The lever may be actuated by foot treadle 16 which has a rod 46 connected by link 48 with a plunger 50 supported within yoke 52 by compression spring 54. The yoke 52 is screwed or otherwise fastened to cover lever 20 in the manner best shown in FIG. 4.

At the upper end of the link 48 a cross head 56 spans the spaced arms of lever 58 as best shown in FIG. 2. The lever 58 is pivoted at 60 to the base and its free end is biased upwardly by springs 132. Near the free end of lever 58 its arms are spanned by a pintle 62 upon which the dog 64 is pivoted. The dog constitutes a part of trippable mechanism for transmitting motion from lever 58 to the lever 70. The relatively long rear portion 66 of the dog biases the dog counterclockwise as viewed in FIG. 4 toward a position in which its nose 68 will engage over the roller 72 mounted on lever 70.

The lever 70 comprises a pair of laterally spaced arms 74 and 76 which are pivoted to the base on pintles 78 and 80. Its free end is biased upwardly by springs 130. The arms 74 and 76 are connected by the bar 82 upon which the roller 72 is mounted. Heat insulating spools 84 equipped with heat radiating flanges and preferably made of non-metallic material project forwardly from the arms 74 and 76 of lever 70 to support the cross bar 88 which carries the cut-off knife 90. The bar 88 contains a heating element 92 for heating the cut-off knife. It will be understood that in this art the so-called "knife" may be merely a heated wire or the like. Thermostats set by dials 140 and 142 on cover lever 20 may be provided at 94 and 96 to control the heating elements 92 and 34, respectively. If desired, the cut-off knife may be provided with auxiliary notching knives 91 (FIG. 8). The optional use of the auxiliary notching knives will slit the work beyond the seal as shown at 190 in FIG. 7, the object being to facilitate opening the sealed bag.

A clamping member 98 is supported by springs 100 from the arms 74 and 76 of the knife-carrying lever 70. The clamping member may have a jacket of silicone or Teflon at 102 to keep it from sticking to the polyethylene or other heat sealable material severed by the knife. When a workpiece lies across the anvil as shown in FIG. 3, the bag mouth 24 overlies the clamping member 106 which is spring supported by spring 108 and has a rearwardly and downwardly inclined surface at 110 in the path of clamping member 98. While the clamping member 106 is bodily yieldable against the bias of spring 108, there is preferably provided a non-yieldable plate at 112 intervening between the clamping member 106 and the anvil 26. This plate not only provides a support over which the work is tensioned before cut off, but it further tends to insulate the clamping member 106 from the heat of the cut-off knife and the heat sealing die.

The tail portion of the dog 64 has a cam surface 116 which, in the position of the parts shown in FIG. 4, rests on a roller 118 adjustable as to height by reason of the fact that it is supported on a threaded post 120 mounted on the base.

The operation is as follows:

The work to be heat sealed (usually a bag) rests across the anvil with its free margins overlying the clamping member 106 as shown in FIG. 3 and FIG. 5. When the foot pedal or other actuating means is depressed, the cover lever 20 is drawn down to engage the heat seal die 28 with the bag on a line spaced from the open mouth thereof. Meantime, as shown in FIG. 4, the engagement of the nose 68 of the dog 64 over the roller 72 on the knife-carrying lever 70 draws the lever 70 downwardly. The floating clamping member 98 carried by the spring arms 100 then engages the free mouth portion 24 of the work to clamp it against the complementary clamp 106 thereby tensioning the material in the path of the "knife." The clamping member 98 tends to move downwardly along the beveled surface 110 as shown in FIG. 5 to draw the material over the plate 112 and to increase the tension on that portion of the bag which projects beyond the anvil. Thereupon the "knife" 90 descending with lever 70 severs the tensioned material between the heat seal clamp and the complementary clamp, thereby cutting off the portion 24 of the work. The resulting heat seal 134 is extremely close to the margin 136 resulting from severance (FIG. 7).

As will be observed in FIG. 5, this movement of lever 70 has resulted in drawing the cam surface 116 of dog 64 over the roller 118 thereby oscillating the dog about its pivotal connection 62 with lever 58. Ultimately the nose of the dog will clear the roller 72. The lever 70 will then spring up immediately under the bias of its supporting springs 130, the object being to keep the knife free of the work to preclude a fouling accumulation of the molten polyethylene or other plastic resin on the knife. This makes it practicable for the operator to maintain the heat seal jaw 28 engaged with the work for as long as may be desired.

The engagement of clamping member 98 with complementary clamping member 106 may have depressed the latter against the bias of its supporting spring 108. When the knife-carrying lever 70 snaps upwardly as above described, the severed piece of waste 24 is thrown free of the surface 110 of the lower clamping member 106 and falls downwardly and rearwardly as guided by the apron 14 or other guiding means.

When the operator releases the pressure exerted on the clamping jaw 28, the cover lever 20 rises subject to the bias of its spring 40 and this permits the intermediate lever 58 to rise subject to the bias of its spring 132. The nose portion 68 of the dog 64 is thereupon carried counterclockwise upwardly, being cammed beneath the roller 92 until the dog is restored to its original position, subject to the bias provided by the weight of its tail portion 66. The apparatus is then in readiness for further operation.

I claim:

1. In a heat sealer, the combination of laterally spaced pairs of clamping jaws for engaging work to be sealed, one pair of such clamping jaws including a heated die for effecting a seal, means for supporting one jaw of each pair at opposite sides of an open space, a knife disposed between said pairs of clamping jaws and having means guiding it for movement into and from said open space between the pairs of clamping jaws and to and from engagement with work extending across said space and engaged by the respective pairs of jaws, and mechanism for actuating said clamping jaws and knife sequentially into work engagement, said mechanism being adapted to advance the knife into said space through and beyond the work engaged by the jaws, the jaws clamping the work while the knife acts thereon and holding the work in tension as the knife enters said space, one of the jaws mounted on said supporting means having a tapered surface over which the work is tensioned by the complementary jaw actuated by said mechanism.

2. In a heat sealer for sealing the mouths of bags and cutting off portions of the bags projecting beyond the seal, the combination with an anvil across which a bag portion adjacent the mouth may be laid, of a heat sealing die having means guiding it for movement to and from the anvil, complementary clamping members spaced from the anvil and disposed to lie at opposite sides of the mouth of a bag, means for guiding one of said clamping members for movement to and from the other, the said other clamping member having a beveled surface with which the member so guided coacts in clamping the mouth of a bag, whereby bag portions interposed between said members are drawn along said beveled surface and thereby tensioned between the clamping members and the anvil, and means for operating the die and the movable clamping member sequentially whereby the die first engages the bag in a direction to hold it to the anvil and the movable clamping member thereafter engages the bag mouth to subject it to tension, and means for severing the tensioned bag between the anvil and said clamping members.

3. A heat sealer according to claim 2 in which said severing means comprises a knife having means guiding it to and from engagement with a bag portion tensioned between the anvil and the clamping members, and means for heating the knife.

4. A heat sealer according to claim 2 in which a plate intervenes between the anvil and the clamping member and has a margin across which the bag extends, said plate being interposed between the knife and the clamping members when the knife is severing the bag.

5. In a heat sealer for bags, the combination with a base and an anvil across which may project the mouth of a bag to be sealed, of a lever pivoted to the base and provided remote from its pivot with a heat sealing die movable on the lever to and from the anvil for engagement with a bag portion resting on the anvil, a clamping member spaced from the anvil and in position to engage the mouth of a bag resting on the anvil, a second clamping member complementary to the first clamping member and movable to and from the first clamping member to clamp a bag mouth thereto, a second lever pivoted to the base and having yieldable means mounted thereon for supporting and guiding the second clamping member for its movement aforesaid, a knife mounted on the second lever and movable therewith to and from engagement with a bag portion interposed between the anvil and the first clamping member for the severance of the bag portion last mentioned, means biasing the first and second levers in a direction to withdraw the heat sealing die and the knife and the second clamping member from positions of bag engagement, means for advancing the respective levers against their respective bias and for sequentially clamping portions of the bag first between the heat sealing die and the anvil and secondly between the first and second clamping member and for thereafter engaging said knife with the intervening portion of the bag, said last means including a snap action mechanism for releasing the second lever from said advancing means independently of the first lever.

6. A heat sealer according to claim 5 in which the advancing means has a yieldable connection with the first lever, the said mechanism including a third lever having means whereby it is actuated from the first lever, the third lever having a dog releasably engaged with the second lever, and means whereby the dog is released in the advanced position of the first and third levers, thereby freeing the second lever for independent return.

7. In a heat sealer for two ply work, the combination with an anvil across which portions of such work may be laid, a heat sealing die having means guiding it for movement to and from the anvil for clamping engagement with and for heat sealing portions of work laid across the anvil, relatively movable clamping members spaced from the anvil for engaging the mouth portions of such work, a cut-off knife having means guiding it for movement between the anvil and the members and into engagement with work portions clamped by the heat sealing means and the anvil and by said members, a base, a first lever pivoted to the base and upon which the heat sealing die is mounted, said lever constituting means for guiding the die, a second lever pivoted to the base and upon which the knife is mounted, the second lever constituting means for guiding the knife, resiliently yieldable arms connected with the second lever and upon which one of the relatively movable members is mounted for movement to and from the other of said members, a third lever having means engaged by the first lever for transmitting motion thereto, the third lever having releasable means for actuating the second lever, and means for the primary operation of the first lever for transmitting motion to the others of said levers and constituting means for sequentially clamping portions of said work first against the anvil and secondly between said relatively movable members and for thereafter engaging said knife with the work between portions so clamped.

8. A heat sealer according to claim 7 and specifically designed for sealing bags constituting said work, and in which the knife has lateral slitting means projecting toward the anvil and adapted to produce slits in the portions of a bag beyond the heat seal effected therein, such slits being adapted to facilitate the opening of the bag.

9. A heat sealer according to claim 7 in which the foot pedal has a yieldable connection with said first lever to constitute means for the primary actuation of the first lever, the several levers having means biasing them in opposition to the movement thereof effected by said foot pedal.

10. A heat sealer according to claim 7 in which said first lever constitutes a cover extending across the second and third levers and relatively movable clamping members.

References Cited by the Examiner
UNITED STATES PATENTS

| | | | |
|---|---|---|---|
| 1,351,115 | 8/20 | Morse | 83—683 |
| 2,139,040 | 12/38 | Salfisberg | 229—66 |
| 2,140,117 | 12/38 | Salfisberg | 53—372 |
| 2,641,304 | 6/53 | Biddinger et al. | 156—583 |
| 2,751,140 | 6/56 | Brady | 229—55 |
| 2,849,050 | 8/58 | Meyerson | 156—530 |
| 2,975,955 | 3/61 | McMurry | 229—55 |
| 2,999,532 | 9/61 | Bursak | 156—510 |
| 3,010,866 | 11/61 | Douchet | 156—530 |

FOREIGN PATENTS

| | | |
|---|---|---|
| 690,614 | 4/53 | Great Britain. |

EARL M. BERGERT, *Primary Examiner.*

DOUGLAS J. DRUMMOND, *Examiner.*